UNITED STATES PATENT OFFICE.

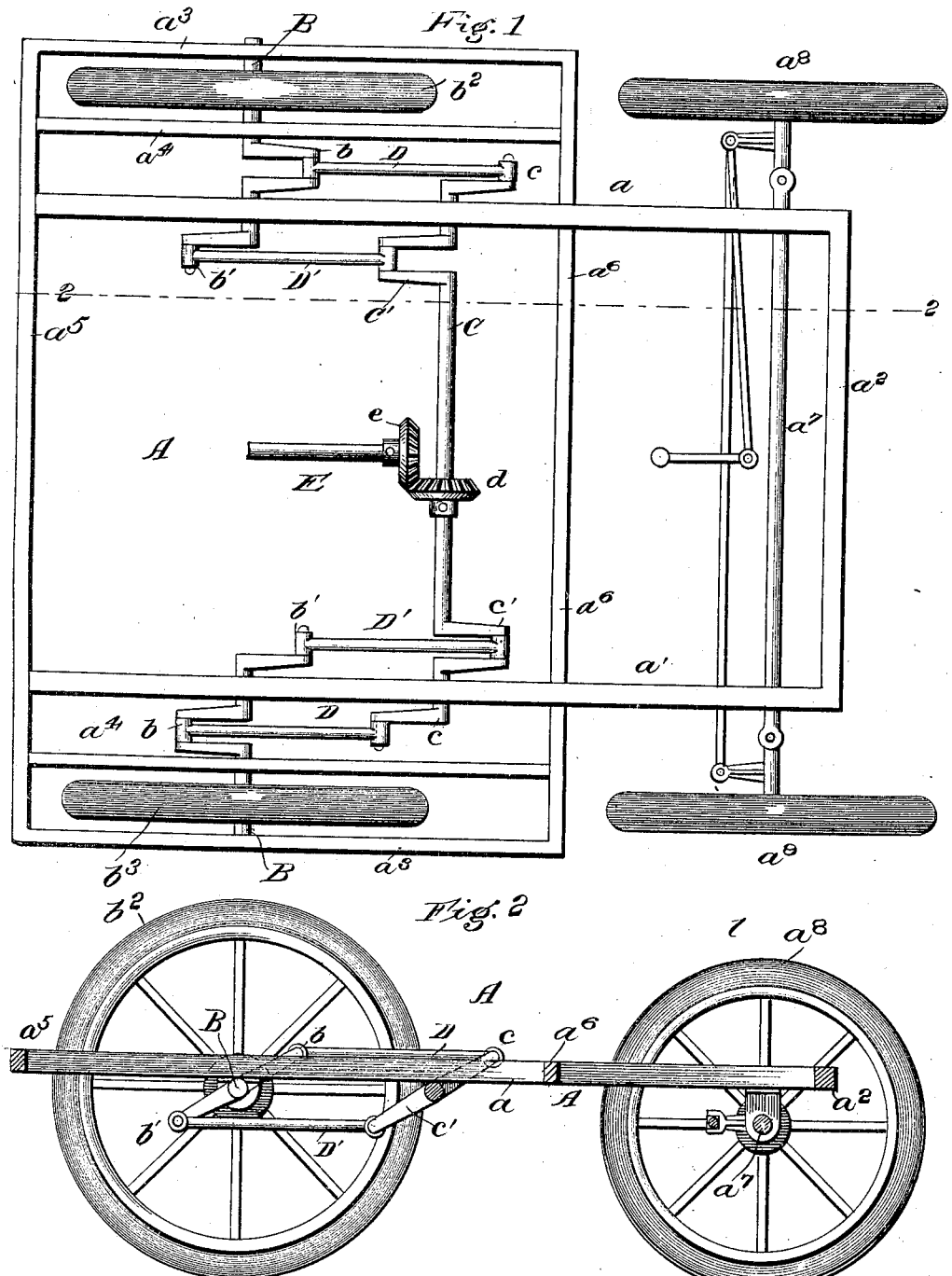

BEN E. HERVEY, OF SPOKANE, WASHINGTON.

AUTOMOBILE.

No. 812,129.　　　Specification of Letters Patent.　　　Patented Feb. 6, 1906.

Application filed August 15, 1905. Serial No. 274,286.

*To all whom it may concern:*

Be it known that I, BEN E. HERVEY, a citizen of the United States, and a resident of Spokane, in the county of Spokane and State of Washington, have made certain new and useful Improvements in Automobiles, of which the following is a specification.

My invention is an improvement in automobiles; and it consists in certain novel constructions and combinations of parts hereinafter described and claimed.

In the drawings, Figure 1 is a plan view of the chassis of an automobile provided with my invention, and Fig. 2 is a section on the line 2 2 of Fig. 1.

In the present embodiment of my invention I provide a supporting-frame A, comprising relatively long longitudinal bars $a$ $a'$, connected at their front ends by a cross-bar $a^2$, and spaced pairs of relatively short longitudinal bars $a^3$ $a^4$, arranged on the outer side of the relatively long bars and spaced apart therefrom. The ends of the respective pairs are connected together and to the relatively long bars by means of the cross-bars $a^5$ $a^6$, and fixed at the front ends of the relatively long bars is a front axle $a^7$, having upon its ends the front wheels $a^8$ $a^9$.

Shafts B, provided with oppositely-arranged crank-arms $b$ $b'$, are journaled upon a relatively long bar and a pair of relatively short bars at the rear of the framework, the crank-arms being arranged upon either side of the relatively long bar, and rear wheels $b^2$ $b^3$ are arranged upon the shafts between the pairs of relatively short bars at either side of the supporting-framework.

A counter-shaft C is journaled upon the relatively long bars at a point in front of the first-named shafts, and either end of the counter-shaft is provided with oppositely-arranged crank-arms $c$ $c'$, the crank-arms being arranged upon either side of the relatively long bar to correspond in position with the crank-arms of the first-named shafts.

Connecting-rods D D' connect the corresponding crank-arms of the shafts, and at approximately the center of the counter-shaft is a bevel-gear $d$, meshing with the bevel-gear $e$ upon a power-shaft E, journaled longitudinally on the framework and driven by any suitable means for supplying power.

It will be understood that the shafts B are in alinement with each other and that any suitable means may be used for moving the front wheels to guide the automobile.

It will be evident from the description that by supporting the wheel-shaft upon either side of the wheel and by providing the oppositely-disposed crank-arms arranged upon either side of the longitudinal bar all cross strain is obviated, and as a consequence friction is reduced to a minimum. A better and more equal transmission of power is also effected by this arrangement, and a more stable support is provided for the wheels.

Having thus described my invention, what I claim as new, and desire to secure by Letters Patent, is—

1. In an automobile, the combination of a supporting-frame comprising relatively long longitudinal bars, connected at their front ends by a cross-bar, spaced pairs of relatively short longitudinal bars arranged without the relatively long bars at the rear ends thereof and spaced apart therefrom, the cross-bars connecting the ends of the pairs and the relatively long bars, an axle fixed on the front ends of the relatively long bars, wheels on the ends of the axle, alined shafts having oppositely-disposed crank-arms journaled on the pairs of bars and on the relatively long bars, and with a crank-arm on either side of said long bars, wheels on the shafts between the members of the pairs of bars, a counter-shaft journaled in front of the shafts and provided at either end with oppositely-disposed crank-arms arranged on either side of the long bars, connecting-rods between the corresponding crank-arms, a bevel-gear on the counter-shaft, a power-shaft journaled longitudinally on the frame and a bevel-gear thereon meshing with bevel-gear on the counter-shaft.

2. In an automobile, the combination of a supporting-frame, a plurality of shafts having oppositely-projecting crank-arms journaled in the frame, wheels on the shafts, a counter-shaft journaled in the frame and provided at either end with crank-arms corresponding to the crank-arms of the first-named shaft, connecting-rods between the corresponding crank-arms, a bevel-gear on the counter-shaft, and a power-shaft journaled longitudinally of the frame and provided with a bevel-gear meshing with the bevel-gear on the crank-shaft.

3. In an automobile, the combination of a supporting-frame, a plurality of alined shafts journaled in the frame, wheels on the shafts, a counter-shaft journaled in the frame, oppositely-arranged driving connections between each of the alined shafts and the counter-shaft, a power-shaft, and connections between the power-shaft and the counter-shaft.

4. In an automobile, the combination of a supporting-frame, a plurality of alined shafts journaled in the frame, and provided with oppositely-projecting crank-arms, wheels on the shafts, a counter-shaft journaled in the frame and provided at either end with crank-arms corresponding to the crank-arms of the alined shafts, connections between the corresponding arms, a power-shaft, and connections between the power-shaft and the counter-shaft.

5. In an automobile, the combination of a supporting-frame, comprising relatively long longitudinal bars, spaced pairs of relatively short longitudinal bars arranged without the long bars at the rear ends thereof and spaced apart therefrom, cross-bars connecting the longitudinal bars, wheels journaled on either side of the frame between the members of the respective pairs of bars and means whereby to drive the wheels.

BEN E. HERVEY.

Witnesses:
J. S. LICHTY,
BEULAH LICHTY.